Figure 1:
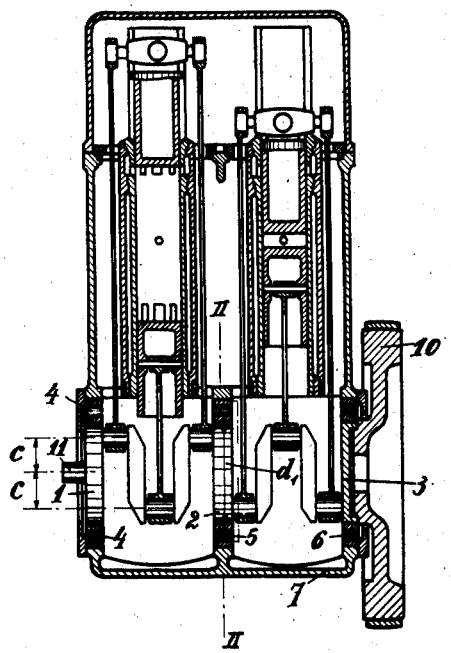

March 6, 1928.  H. JUNKERS  1,661,181

CRANK SHAFT

Filed Nov. 17, 1921

Inventor:
Hugo Junkers
by D. Kilmarnock
Attorney.

Patented Mar. 6, 1928.

1,661,181

UNITED STATES PATENT OFFICE.

HUGO JUNKERS, OF DESSAU, GERMANY.

CRANK SHAFT.

Application filed November 17, 1921, Serial No. 515,986, and in Germany February 17, 1921.

My invention relates to crank shafts for use in internal combustion engines and the like and more particularly in engines having pistons moving in opposite directions. It is an object of my invention to reduce the width of such engines by supporting the crank shaft in a particular way.

Engines of the type aforementioned involve the draw-back that their width is comparatively great owing to the space required for the pins, cheeks and journals of the crank shaft.

According to my invention, I overcome this drawback by discarding the separate journals for supporting the crank shaft in the casing and replacing them by the crank cheeks which are formed like disks and in consideration of their great diameter, are preferably supported in ball or roller bearings, but may also be supported in ordinary bearings provided that sufficient lubrication be provided for. The construction of reliable bearings for the disk-shaped cheeks is facilitated by the fact that the load on the bearings is comparatively small, owing to the balance of forces in the set of pistons.

It sometimes suffices to reduce the distance between the axes of the cylinders, to a minimum, while at the ends of the engine there is sufficient space for providing ordinary bearings. In such cases, only the bearings between the cylinders are replaced by disk-shaped cheeks according to my invention, while the end bearings of the shaft are constructed after the manner of ordinary journal bearings.

In carrying my invention into practice I prefer making the stroke of the outer piston in each set smaller than that of the inner piston, as in this case the disk-shaped cheeks may have a smaller diameter than if the strokes of both pistons of the set were equal. In consequence of the smaller diameter of the cheeks friction in the bearings is reduced and the bearings, particularly in the case of ordinary bearings, are rendered far more reliable.

When designing such bearings, the deformations of the crank shaft occuring during operation should be considered, particularly in larger engines, by so constructing the bearings that the cheeks are capable of assuming slightly inclined positions in relation to the axis of the shaft. For instance, the bearing bushes may be provided with spherical surfaces; in ball bearings spherical races may be employed. In ordinary bearings, particularly for smaller engines, it often suffices to support the bearing bushes on a narrow surface which allows some play.

In the drawings affixed to this specification and forming part thereof, several embodiments of my invention are illustrated diagrammatically by way of example. In the drawings Fig. 1 is a sectional elevation of a twin-cylinder engine provided with my improved crank shaft, Fig. 2 is a partial cross section on line II—II in Fig. 1, Fig. 3 is a section of part of the crank case illustrating a modified construction of my improved crank shaft, and Fig. 4 is a detail illustrating a portion of the bearing according to Fig. 3, drawn to a larger scale.

Figure 2:
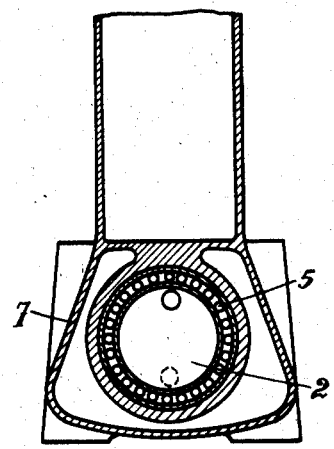

Referring to Figs. 1 and 2, the inner and outer pistons of the twin cylinder engine have equal strokes so that the radii $c$ of the cranks for the inner and outer pistons are equal. The crank shaft is provided between each group of cranks and at either end with disk shaped cheeks 1, 2 and 3, which are supported in roller bearings 4, 5 and 6 in the crank case 7. The flywheel 10 having the form of a pulley is directly connected with the disk 3. A pin on disk 1 serves for actuating the valve gear, auxiliary devices and the like.

The ball or roller bearings are preferably so designed that it is possible to insert the crank shaft into and to withdraw it from the casing in axial direction.

Figure 3:
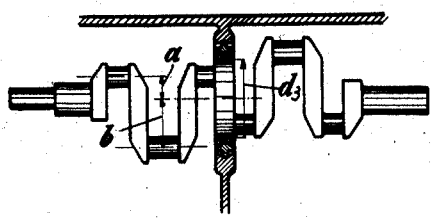
Figure 4:
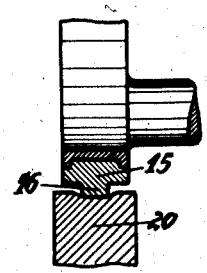

In Fig. 3, I have illustrated a crank shaft for a twin cylinder engine with pistons moving in opposite directions in which the sum total of the strokes of the pistons in each cylinder is the same as in the engine illustrated in Fig. 1, the stroke of the outer piston in each cylinder being however shorter than the stroke of the inner pistons. Accordingly the radius $a$ of the cranks for the outer pistons is shorter than the radius $b$ of the cranks for the inner pistons. In consequence thereof, the diameter $d_3$ of the central disk shaped cheek 2 is considerably smaller than the diameter $d_1$ of the corresponding cheek in the engine of Fig. 1, where the strokes of both pistons in each set are equal. Owing to the smaller diameter and the smaller circumferential velocity of the cheek 2, and also owing to the cheek deviating to a less degree from its normal position when the crank shaft bends, conditions are much more favourable for an ordinary bearing than in the case of Fig. 1.

In Fig. 4, I have illustrated on a larger scale the support for the bearing bush of an ordinary bearing for a disk shaped cheek. The bush 15 is provided with a narrow annular rim 16, by means of which it is supported on the crank case 20. This affords a certain play, so that the bush 15 is able to follow lateral inclinations of the cheek.

I wish it to be understood that I do not desire to be limited to the exact details of construction shown and described, for obvious modifications will occur to a person skilled in the art.

I claim:

1. An engine comprising in combination, a cylinder, two pistons adapted to simultaneously reciprocate in said cylinder in opposite directions, a three throw crank shaft having a middle crank operatively connected with the inner piston and two outer cranks operatively connected with the outer piston and extending oppositely to and having smaller radii than said middle crank, a circular disc carrying one of said outer cranks, a bearing for said disc, permitting angular movement of said disc, and a crank case constructed to permit of removal of the crank shaft in an axial direction.

2. An engine comprising in combination, two cylinders open at both ends, an inner and an outer piston in each cylinder, a shaft comprising for each cylinder a middle crank operatively connected to said inner piston and two outer cranks operatively connected to said outer piston and of smaller radii than and opposed to said middle crank, a circular disc uniting the adjoining outer cranks of said shaft and supported to permit of angular movements of the disc, a crank case constructed to permit of displacement of the shaft in an axial direction, shaft pins on the free arms of the outer cranks, and bearings for said shaft pins.

3. An engine comprising in combination, two cylinders open at both ends, an inner and an outer piston in each cylinder, a shaft comprising for each cylinder a middle crank operatively connected to said inner piston and two outer cranks operatively connected to said outer piston and of smaller radii than and opposed to said middle crank, a circular relatively narrow bearing disc uniting the adjoining outer cranks of said shaft, a bearing bush directly supporting said disc and itself supported so as to allow the disc to rock, shaft pins on the free arms of the outer cranks, and bearings for said shaft pins.

In testimony whereof I affix my signature.

HUGO JUNKERS.